United States Patent [19]

Maasbach

[11] 4,109,442

[45] Aug. 29, 1978

[54] METHOD OF TREATING PLANTS AND MEANS TO BE USED IN THIS CONNECTION

[76] Inventor: Pieter Cornelis Maasbach, Gerard Scholtenstraat 125a, Rotterdam, Netherlands

[21] Appl. No.: 760,410

[22] Filed: Jan. 18, 1977

[30] Foreign Application Priority Data

Jan. 22, 1976 [NL] Netherlands .......................... 7600654

[51] Int. Cl.² .......................... B65B 43/08; B65B 67/12
[52] U.S. Cl. ............................................ 53/29; 47/76; 53/37; 53/390; 93/35 DS
[58] Field of Search .................. 53/37, 390, 29; 47/74, 47/76, 84; 150/11; 206/423; 93/35 DS

[56] References Cited

U.S. PATENT DOCUMENTS

3,369,584  2/1968  Faccio et al. ...................... 150/11 X
3,550,318  12/1970  Remke et al. ........................... 47/76
3,550,662  12/1970  Remke et al. ........................ 47/76 X

FOREIGN PATENT DOCUMENTS

1,278,716  11/1961  France ......................................... 150/11

*Primary Examiner*—Travis S. McGehee
*Attorney, Agent, or Firm*—Warren, Chickering & Grunewald

[57] ABSTRACT

A method of treating plants for the purpose of transport and storage, according to which method the root section together with a certain quantity of earth is enveloped by a fabric, and wherein is used a bag, pouch or the like of e.g. an organic material closed at one end, and the other, open end of which comprises a cord plaited through the fabric, into which pouch is positioned the root section together with a clod of earth, and which cord is tightened and tied.

3 Claims, 6 Drawing Figures

METHOD OF TREATING PLANTS AND MEANS TO BE USED IN THIS CONNECTION

The invention relates to a method of treating plants for the purpose of transport and storage, according to which method the root section together with a certain quantity of earth is enveloped by a kind of gauze. In this manner it is possible to store plants for a considerable length of time without the root section being damaged or appreciably dried up, as a result of which of course the quality is not adversely affected either. The plants can be planted immediately and in that case there is hardly question of a check in growth.

Up to now the plants were dug from the soil together with a certain quantity of earth, positioned on an angular piece of fabric, the tips of which were folded towards the stem and fastened together. This method of working is not only time-consuming and therefore expensive, but in the long run also the hands of the packaging employees are rather seriously wounded owing to frequent contact with the fabric.

It is the object of the invention to remove the above drawbacks, which is achieved by using a bag, pouch or the like of a consumable material closed at one end, and the other, open end of which comprises a cord plaited through the fabric, into which pouch the root section together with a clod of earth is positioned, after which the cord is tightened and tied. In this manner the rate of production can be increased considerably while the employees need hardly do anything more but tying the cords, which can be done without any risk of sustaining an injury.

The manner of working can be applied even more favourably by positioning the pouch with its closed side downwardly into a ring which by means of legs or otherwise is kept at some distance from the surface of the soil, stretching the hem-stitched top side of the pouch comprising a drawing cord over a beaded edge present at the ring, positioning the root section together with a clod of earth into the pouch, loosening the top side of the pouch, and finally tightening and tying the cord.

Further particulars of the invention are explained with reference to the drawing, wherein FIG. 1 shows a phase in the production of a bag, pouch or the like to be used in the novel method;

Figure 1:
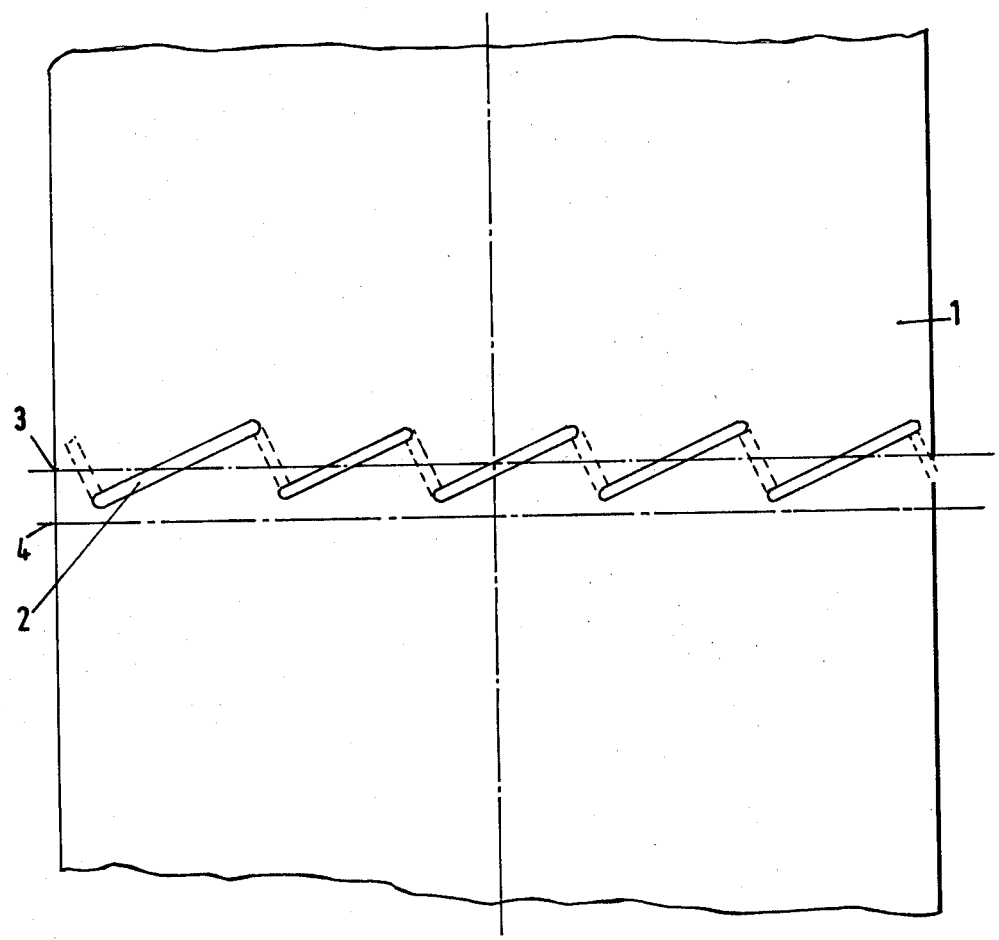
Figure 2:
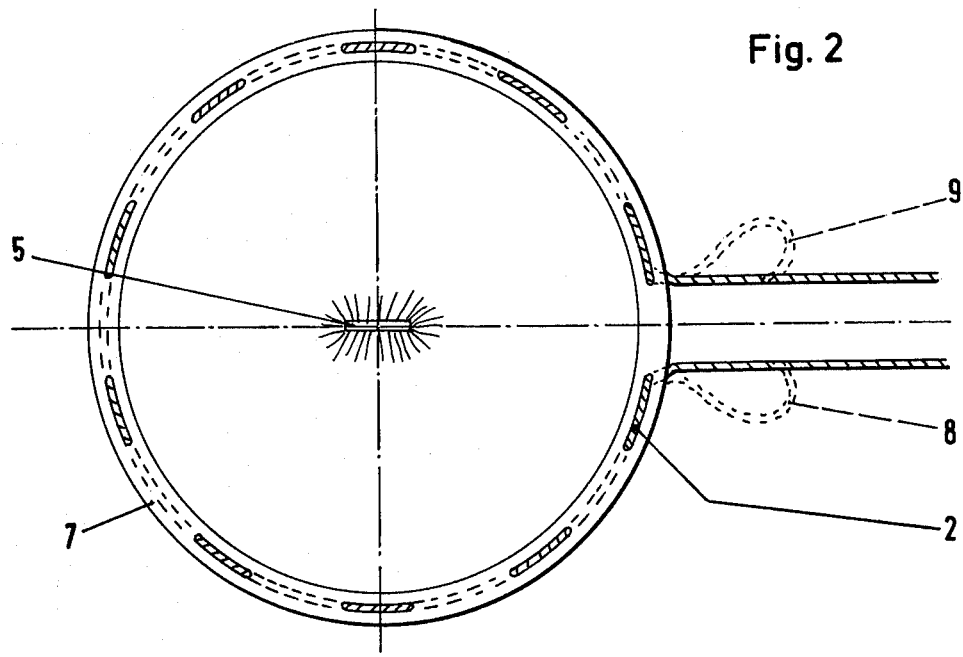
FIGS. 2 and 3 show a top-view and a side-view of a ready product.
Figure 3:
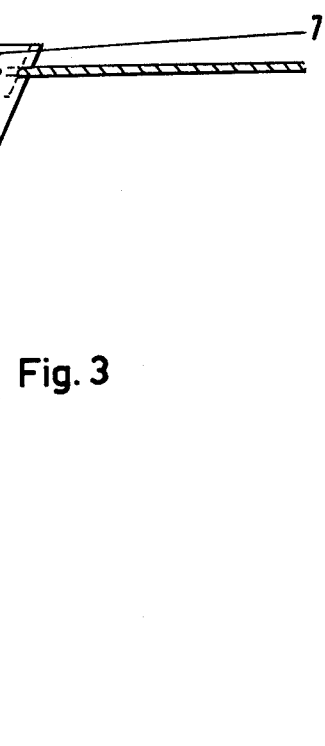

A bag, pouch or the like to be used for packaging according to the invention the root section of plants is made from a tube or hose 1, which is preferably produced on a circular knitting machine. Following its circumference, at specific interspaces there is plaited a cord 2 through the tube, which tube at some distance from cord 2 is cut through in cross-sectional direction on line 3. The end provided with cord 2 is folded on line 4, thus producing a hem. The open end of the piece of tube is closed by means of a metal staple 5, so that a pouch or bag 6 is formed as shown in FIGS. 2 and 3.

In the ready state of the pouch, cord 2 substantially lies outside hem 7, and initially emerges in the form of loops 8 and 9. These loops allow the cord to be grasped and tightened easily, when a plant is brought with its root section inside pouch 6.

Figure 4:
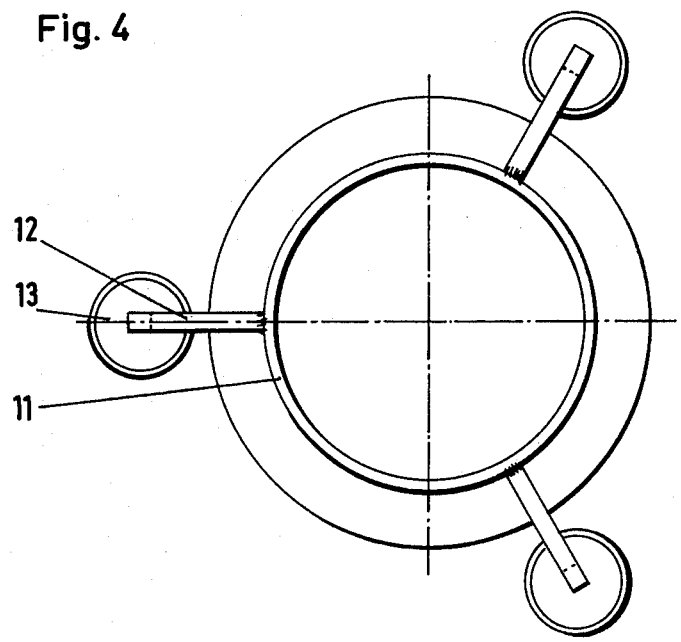
FIGS. 4 and 5 show a top-view and a side-view of a ring to be used during packaging.
Figure 5:
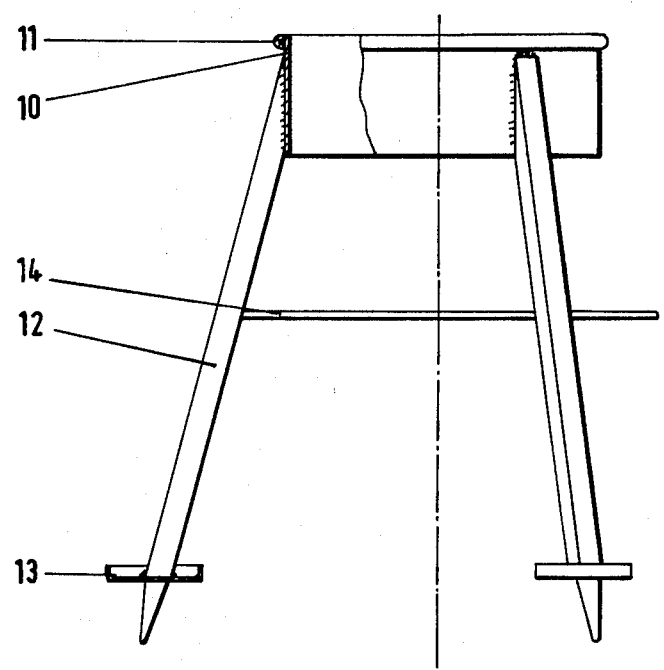
Figure 6:
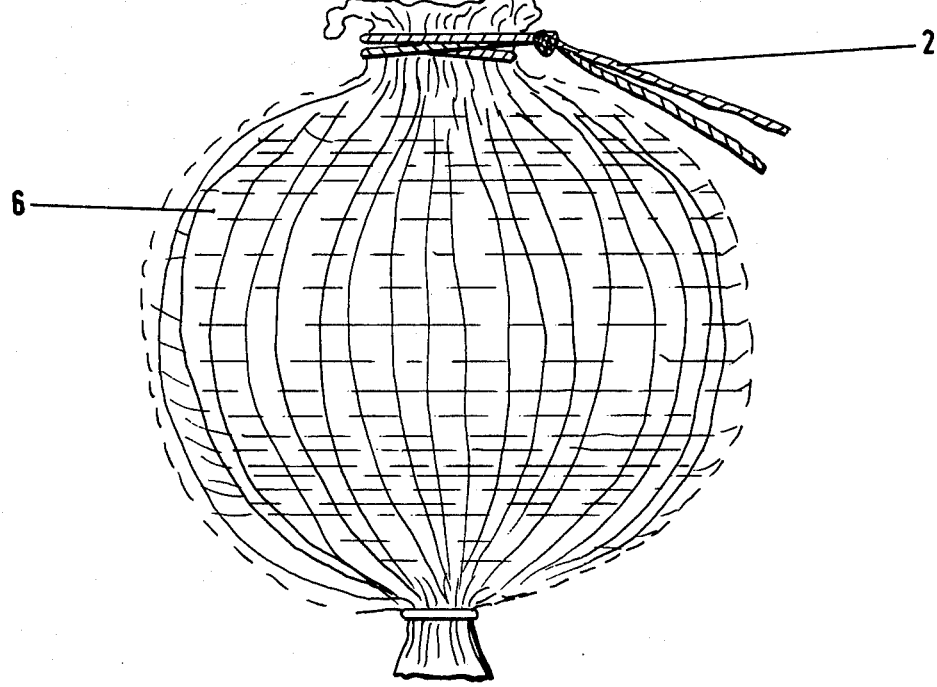
FIG. 6 shows a side-view of a shrub or the like treated according to the invention.

In FIGS. 4 and 5 is shown a handy aid to be used for packaging the root section of a plant. This device consists of a flat ring 10 having a bead 11, over which can be stretched hem 7 of a pouch. The ring rests with three legs 12 on the soil while plates 13 prevent the whole from sinking too deeply into a soft soil. By 14 is indicated an adjustable platform to support the bottom side of a pouch, and the adjustment of the height of the platform depends on the size of the root section to be packaged and that of the pouch to be used. As is shown in FIG. 6, pouch 6 is drawn completely around the root section of e.g. a shrub 15 as contained therein, and the cord is tied around stem 16. The whole has a neat appearance. The quantity of earth is such that, even after a longer storage, the moisture content of the root section hardly decreases. The plant can be planted immediately and, owing to the use of organic material for the pouch, the same will be consumed after a rather short period of time by the soil-water and the components present therein. A check in the growth of, or a detrimental influence on the root section has not been established, the less so because the roots remain surrounded by earth, if necessary supplemented by moss, and consequently the contact between the roots and the earth is not interrupted and the feeding process can go on undisturbedly. The appearance of the packaged plants is improved, which also stimulates the sale thereof.

I claim:

1. A method of treating plants for purpose of transport and storage wherein the root section of the plant to be treated together with earth forming a ball is enveloped by a fabric of organic consumable material, comprising:

threading a plurality of draw cords on peripheral courses through the side wall of a length of tubing formed of flexible organic consumable material, the draw cords being in substantially equal-length increments along the length of said tubing;

cutting said tubing on transverse planes substantially parallel to and spaced from said cords to provide a plurality of tubing sections having said cord woven therethrough adjacent a first end and being open adjacent a second, opposite end;

cinching said wall at said second end to provide a centralized closure for each of said sections;

distending said first end of one of said sections over and around an exteriorly mounted substantially horizontally disposed ring support;

positioning said root ball through the open distended end of said tubing section and interiorly thereof;

removing said first section end from said ring support; and drawing said draw cord to tighten said first section end around the stem of the plant above said root ball.

2. The method of claim 1, folding said side wall at said first end into overlying relation to said cord to provide a hem therefor; and distending said hem over and around said ring support.

3. A method of treating plants for purpose of transport and storage wherein the root section of the plant to be treated together with earth forming a ball is enveloped by a fabric of organic consumable material, comprising:

threading a plurality of draw cords on peripheral courses through the side wall of a length of tubing formed of flexible organic consumable material, the draw cords being in substantially equal-length increments along the length of said tubing;

cutting said tubing on transverse planes substantially parallel to and spaced from said cords to provide a plurality of tubing sections having said cord woven therethrough adjacent a first end and being open adjacent a second, opposite end;

cinching said wall at said second end to provide a centrallized closure for each of said sections;

distending said first end of one of said sections over and around an exteriorly mounted substantially horizontally disposed ring support having a platform mounted centrally thereunder for support of said second section end;

positioning said root ball through the open distended end of said tubing section and interiorly thereof and onto supporting relation on said platform;

removing said first section end from said ring support;

drawing said draw cord to tighten said first section end around the stem of the plant above said root ball; and removing vertically through said ring support said plant stem and enveloped root ball.

* * * * *